(12) United States Patent
Kashihara et al.

(10) Patent No.: US 6,847,600 B2
(45) Date of Patent: Jan. 25, 2005

(54) METHOD FOR ESTIMATING THE QUALITY OF AN INFORMATION RECORDING MEDIUM UTILIZING EQUALIZATION SIGNALS

(75) Inventors: Yutaka Kashihara, Fuchu (JP); Yutaka Okamoto, Chofu (JP); Chosaku Noda, Kawasaki (JP); Hideo Ando, Hino (JP); Koichi Hirayama, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 449 days.

(21) Appl. No.: 09/808,234

(22) Filed: Mar. 15, 2001

(65) Prior Publication Data

US 2001/0043537 A1 Nov. 22, 2001

(30) Foreign Application Priority Data

May 10, 2000 (JP) .................................... 2000-137179
Oct. 2, 2000 (JP) .................................... 2000-302668

(51) Int. Cl.[7] .............................................. G11B 5/09
(52) U.S. Cl. .............................. 369/53.34; 369/53.22; 369/47.27; 375/232
(58) Field of Search ................ 369/53.22, 53.31, 369/47.25, 47.26, 47.27, 53.34; 375/232, 229

(56) References Cited

U.S. PATENT DOCUMENTS

| | | | | |
|---|---|---|---|---|
| 3,629,736 A | * | 12/1971 | Hirsch et al. .................. 333/18 |
| 4,520,393 A | * | 5/1985 | Zwijsen et al. ............. 348/530 |
| 5,287,228 A | * | 2/1994 | Sawaguchi et al. ........... 360/57 |
| 5,355,356 A | * | 10/1994 | Johann et al. ........... 369/59.15 |
| 5,490,091 A | * | 2/1996 | Kogan et al. ................ 702/180 |
| 5,682,273 A | * | 10/1997 | Hetzler ......................... 360/75 |
| 5,986,831 A | * | 11/1999 | Muto ........................... 360/46 |
| 6,057,951 A | * | 5/2000 | Sugawara ................... 398/209 |
| 6,160,673 A | * | 12/2000 | Izumi et al. .................. 360/46 |
| 6,215,433 B1 | * | 4/2001 | Sonu et al. .................. 341/155 |
| 6,292,912 B1 | * | 9/2001 | Cloke et al. ................ 714/718 |
| 6,339,574 B1 | * | 1/2002 | Kashihara ................. 369/59.22 |
| 6,363,111 B1 | * | 3/2002 | Hee et al. .................... 375/224 |
| 6,535,345 B1 | * | 3/2003 | Shimoda ...................... 360/65 |
| 6,671,334 B1 | * | 12/2003 | Kuntz et al. ................ 375/340 |

FOREIGN PATENT DOCUMENTS

| | | |
|---|---|---|
| JP | 7-235150 | 9/1995 |
| JP | 8-195037 | 7/1996 |

* cited by examiner

*Primary Examiner*—Gautam R. Patel
(74) *Attorney, Agent, or Firm*—Oblon, Spivak, McClelland, Maier & Neustadt, P.C.

(57) ABSTRACT

An estimation method produces a reproduction signal while reading from an information recording medium such as an optical disk, and uses an equalizer to produce an equalization signal. The method then synthesizes distribution levels of the equalization signal that range over distributions of (n+1) levels L0, L1, ..., Ln (in which L0<L1 ... <Ln and n>2), thereby creating a new distribution. The method then uses the standard deviation of the new distribution as an estimation reference value to estimate the quality of an information reproduction apparatus or the quality of the information recording medium. The quality estimate may be used to adjust a circuit in an information reproduction apparatus that reads the information recording medium.

6 Claims, 17 Drawing Sheets

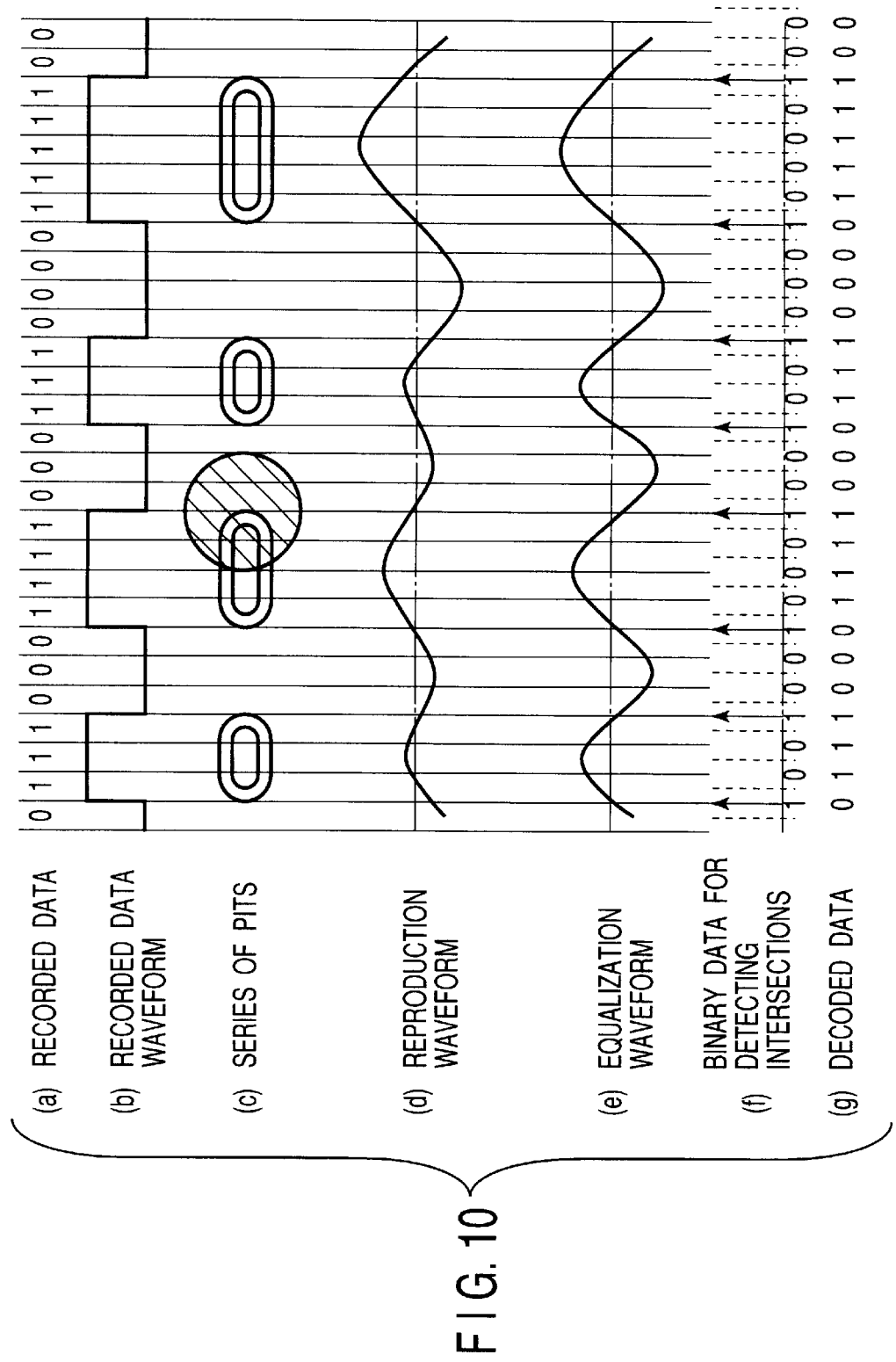
F I G. 10

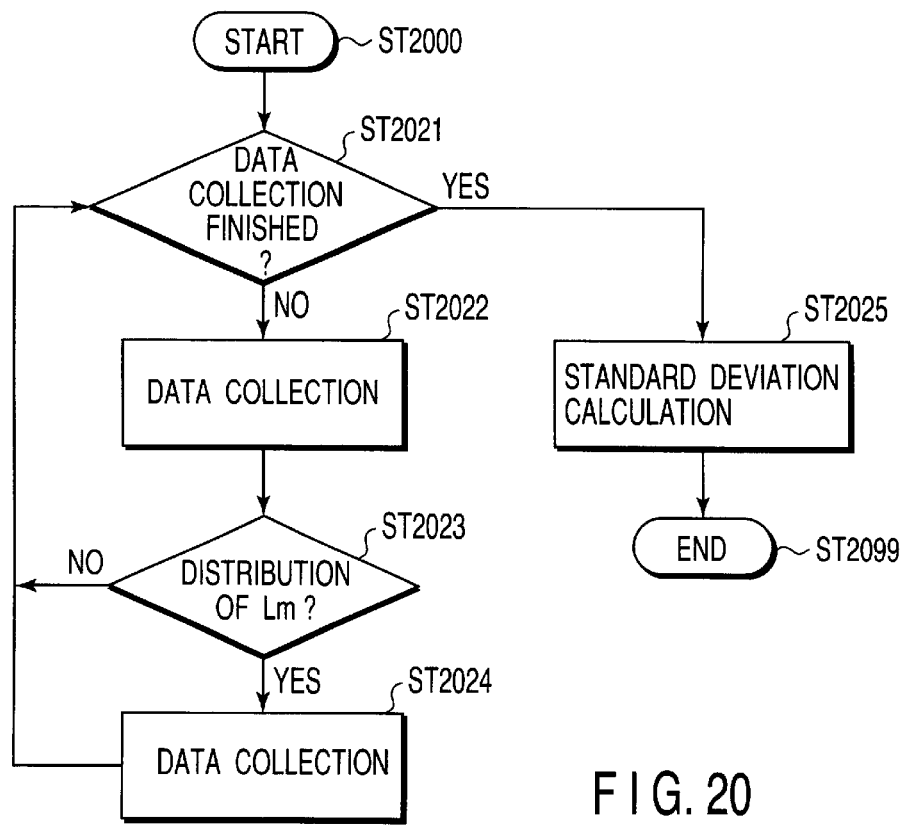
F I G. 20
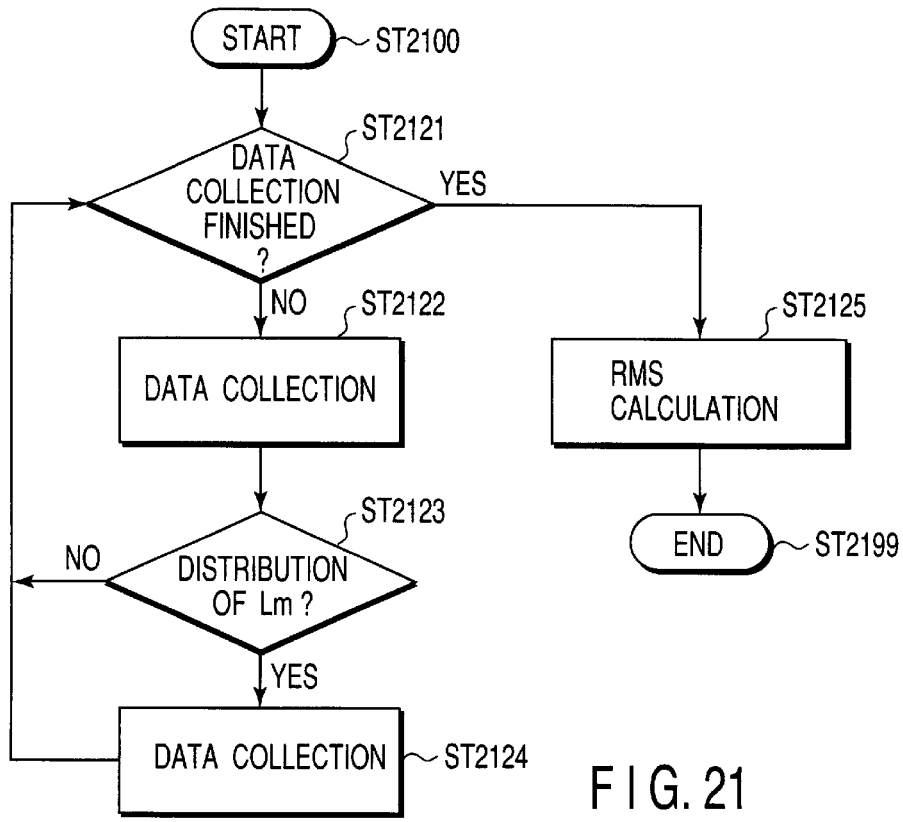
F I G. 21

METHOD FOR ESTIMATING THE QUALITY OF AN INFORMATION RECORDING MEDIUM UTILIZING EQUALIZATION SIGNALS

CROSS-REFERENCE TO RELATED APPLICATIONS

This application is based upon and claims the benefit of priority from the prior Japanese Patent Applications No. 2000-137179, filed May 10, 2000; and No. 2000-302668, filed Oct. 2, 2000, the entire contents of both of which are incorporated herein by reference.

BACKGROUND OF THE INVENTION

1. Field of the Invention

This invention relates to a method for estimating the quality of an information reproduction apparatus or the quality of an information recording medium. It also relates to an information recording medium that satisfies a predetermined estimation standard. It further relates to an information reproduction apparatus for reproducing information stored in an information recording medium that satisfies a predetermined estimation standard.

2. Discussion of the Background

In recent years, DVD systems have been commercially produced to meet the demand for recording MPEG2 images on one surface of an optical disk of 12 cm diameter for two hours or more. According to the DVD standards, the memory capacity, the track density and the linear density of one surface of a disk are 4.7 GB, 0.74 $\mu$m/track and 0.267 $\mu$m/bit, respectively. Any DVD based on the DVD standards will hereinafter be referred to as a "currently available DVD".

An optical head incorporated in a DVD reproduction apparatus reproduces information stored in on optical disk such as a DVD. The optical head includes an LD (Laser Diode), an object lens, a condensing lens and a photodetector, etc. A light beam emitted from the LD converges, through the object lens, onto a series of pits formed in a track on the optical disk. A light beam reflected from the optical disk converges onto the photodetector through the condensing lens, and is converted into a reproduction signal. The reproduction signal from the photodetector is input to a reproduction signal processing system, is then subjected to waveform equalization in an equalizer, and is decoded into data in a detector. In the case of the DVD standards, the LD of the optical head has a wavelength of 0.65 $\mu$m, and the object lens has a numerical aperture of 0.6.

The currently available DVD reproduction apparatus generally uses the waveform slice method as a reproduction signal processing method. Suppose that the optical head incorporated in the currently available DVD reproduction apparatus reproduces information stored not in a currently available DVD, but in a next generation DVD which has a higher density recording capacity. Since the next generation DVD has a higher track density, a reproduction signal output from this DVD contains a large signal-degrading crosstalk component. Further, the higher the linear density of the DVD, the flatter the waveform of the reproduction signal. The equalizer, which amplifies the high frequency component of the reproduction signal, needs to amplify the high frequency component to a high degree when the waveform of the input reproduction signal is not so sharp. This process results in the amplification of the signal-degrading component, too. In the case of using the waveform slice method as the signal detection method, the amplification of the signal-degrading component is inevitable when the recording density of the apparatus is high, and hence correct data decoding cannot be executed.

In place of the waveform slice method, the partial response and maximum likelihood (PRML) method is proposed as a reproduction signal processing method employed when the reproduction signal has a low signal to noise ratio (SNR). In the PRML method, at first, the equalizer equalizes the waveform of a reproduction signal into a waveform having a predetermined correlation therewith, between recognition positions called "partial response characteristic" (PR characteristic) positions. The reproduction signal processing system using the PRML method generally employs a Viterbi decoder, a typical maximum likelihood decoder, as a detector located after the equalizer. If the equalizer equalizes the reproduction signal waveform into a waveform of, for example, PR (1, 2, 2, 1) characteristic (explained below), the Viterbi decoder selects the series of signal values of the equalization signal that minimizes the difference between a series of sample values of the equalization signal and a series of ideal values of the equalization signal, and outputs binary data (decoded data) corresponding to the selected series.

Sample values of an equalization signal are not necessarily identical to ideal sample values because of, for example, noise. The difference between a sample value and an ideal sample value is called "equalization error". In the PRML method, this difference is used as an estimation reference value for estimating the quality of an optical disk medium or adjusting an optical disk apparatus. To obtain the equation error, the ideal sample value is necessary. Japanese Kokai Publications Nos. 7-235150 and 8-195037, which are incorporated herein by reference in their entirety, disclose techniques for calculating an ideal sample value on the basis of the decoded data obtained by Viterbi decoding.

If the information recording/reproduction system that uses the PRML method for processing a reproduction signal employs the above-described conventional method using a recognition result in order to calculate an estimation reference value for estimating the quality of a recording medium or adjusting the circuit in the apparatus, it must incorporate a recognition circuit and a timing adjustor circuit. In other words, the system inevitably has a large size and a complicated structure.

SUMMARY OF THE INVENTION

The present invention has been developed to solve the aforementioned problems, and provides an estimation method, an information recording medium and an information reproduction apparatus as described below:

An estimation method for easily estimating the quality of an information reproduction apparatus and/or the quality of an information recording medium;

An information recording medium that is obtained after estimation executed by the estimation method for easily estimating the quality of the information recording medium, and hence satisfies a predetermined estimation standard; and An information reproduction apparatus for reproducing information stored in an information recording medium that is obtained after estimation executed by the estimation method for easily estimating the quality of the information recording medium, and hence satisfies a predetermined estimation standard.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a view illustrating operating waveforms obtained when a waveform slice method is employed;

FIG. 20 is a flowchart illustrating a seventh process for calculating an estimation reference value used to estimate the quality of an information reproduction apparatus or the quality of an information recording medium; and FIG. 21 is a flowchart illustrating an eighth process for calculating an estimation reference value used to estimate the quality of an information reproduction apparatus or the quality of an information recording medium.

DETAILED DESCRIPTION OF THE PREFERRED EMBODIMENTS

First, a waveform slice method will be described with reference to FIG. 10 that illustrates operating waveforms. An optical disk has a series of pits as shown in (c) of FIG. 10, which correspond to a recorded waveform as shown in (b) of FIG. 10 and indicating recorded data as shown in (a) of FIG. 10.

When reproducing information recorded as above in the optical disk, a reproduction light beam is emitted from an LD in an optical head, onto the optical disk, thereby forming a fine beam spot as indicated by the hatched circle in (c) of FIG. 10. As a result, a light beam is reflected from a series of pits and converted into a reproduction signal.

The waveform of the reproduction signal (hereinafter referred to as a "reproduction waveform") is not a rectangular waveform as shown in (b) of FIG. 10, but a rather flattened waveform as shown in (d) of FIG. 10. Therefore, an equalizer subjects the reproduction waveform to waveform equalization as shown in (e) of FIG. 10, so that each intersection of a resultant equalized waveform and a predetermined threshold value (indicated by the dotted line) is positioned at the center of a corresponding window. More specifically, the equalizer amplifies the frequency components of the reproduction signal.

A detector detects intersections of the equalized waveform and the threshold value, as is shown in (f) of FIG. 10. If an intersection is found in a window, binary data of "1" is output. If, on the other hand, no intersection is found in a window, binary data of "0" is output. The binary data resulting from the detection of the intersections is subjected to NRZI conversion to thereby obtain decoded data as shown in (g) of FIG. 10.

Figure 11:
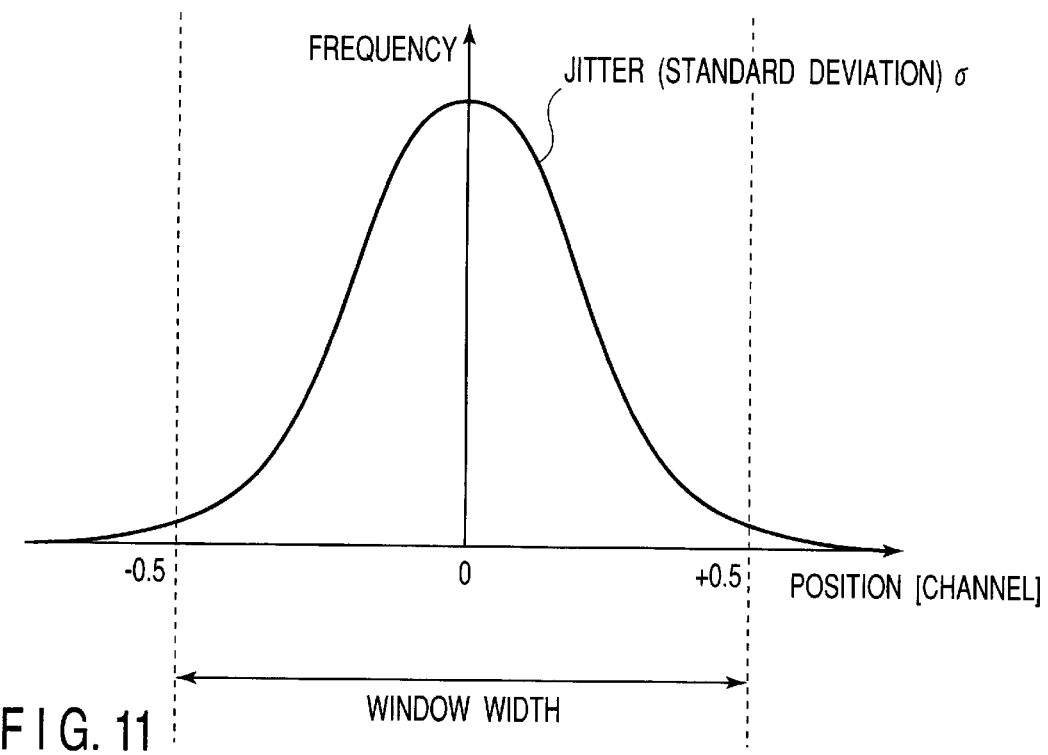
FIG. 11 is a view useful in explaining an estimation reference value used when the waveform slice method is employed.

The intersections of equalized waveform and the threshold value are not always positioned at the center of the respective windows because of, for example, noise. FIG. 11 shows a distribution of detected intersections with respect to respective windows. The standard deviation of intersection data, standardized on the basis of the width of each window, is called "jitter," and is used as an estimation reference value for medium quality estimation or for circuit adjustment.

Figure 12:
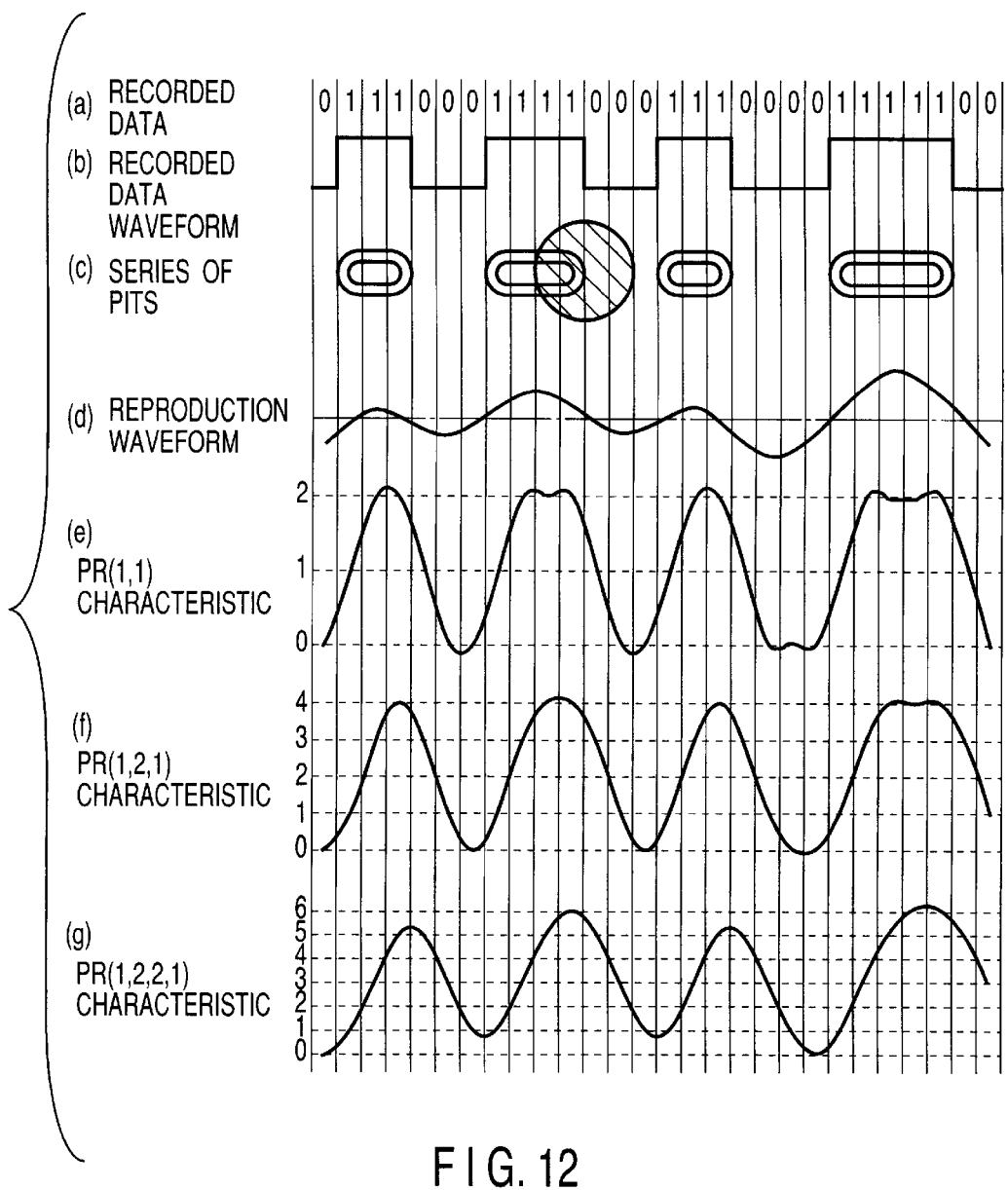
FIG. 12 is a view useful in explaining various types of PR characteristics.

Referring now to FIG. 12, various types of PR (partial response) characteristics will be described. Waveforms (a)–(d) of FIG. 12 are views similar to waveforms (a)–(d) of FIG. 10, illustrating recorded data, a waveform indicating the recorded data, a series of pits and a reproduction waveform, respectively. Further, waveforms (e), (f) and (g) of FIG. 12 show waveforms obtained by subjecting the reproduction waveform of (d) of FIG. 12 to equalization executed by the equalizer on the basis of PR (1, 1) characteristic, PR (1, 2, 1) characteristic and PR (1, 2, 2, 1) characteristic, respectively.

PR (1, 1) characteristic indicates a characteristic in which an impulse appears at the ratio of 1:1 in two adjacent recognition positions. PR (1, 2, 1) characteristic indicates a characteristic in which an impulse appears at the ratio of 1:2:1 in three adjacent recognition positions. PR (1, 2, 2, 1) characteristic indicates a characteristic in which an impulse appears at the ratio of 1:2:2:1 in four adjacent recognition positions. Analogous descriptions may be made of any other PR characteristics (not shown).

As is evident from waveforms (e), (f) and (g) of FIG. 12, the sharpness of the characteristic of the equalized waveform is reduced in going from the order of PR (1, 1) characteristic, to the PR (1, 2, 1) characteristic, and to the PR (1, 2, 2, 1) characteristic. In the PRML method, the equalization of a reproduction waveform into a waveform of a PR characteristic closer thereto, can suppress increases in signal-degrading components in the equalizer.

Figure 13:
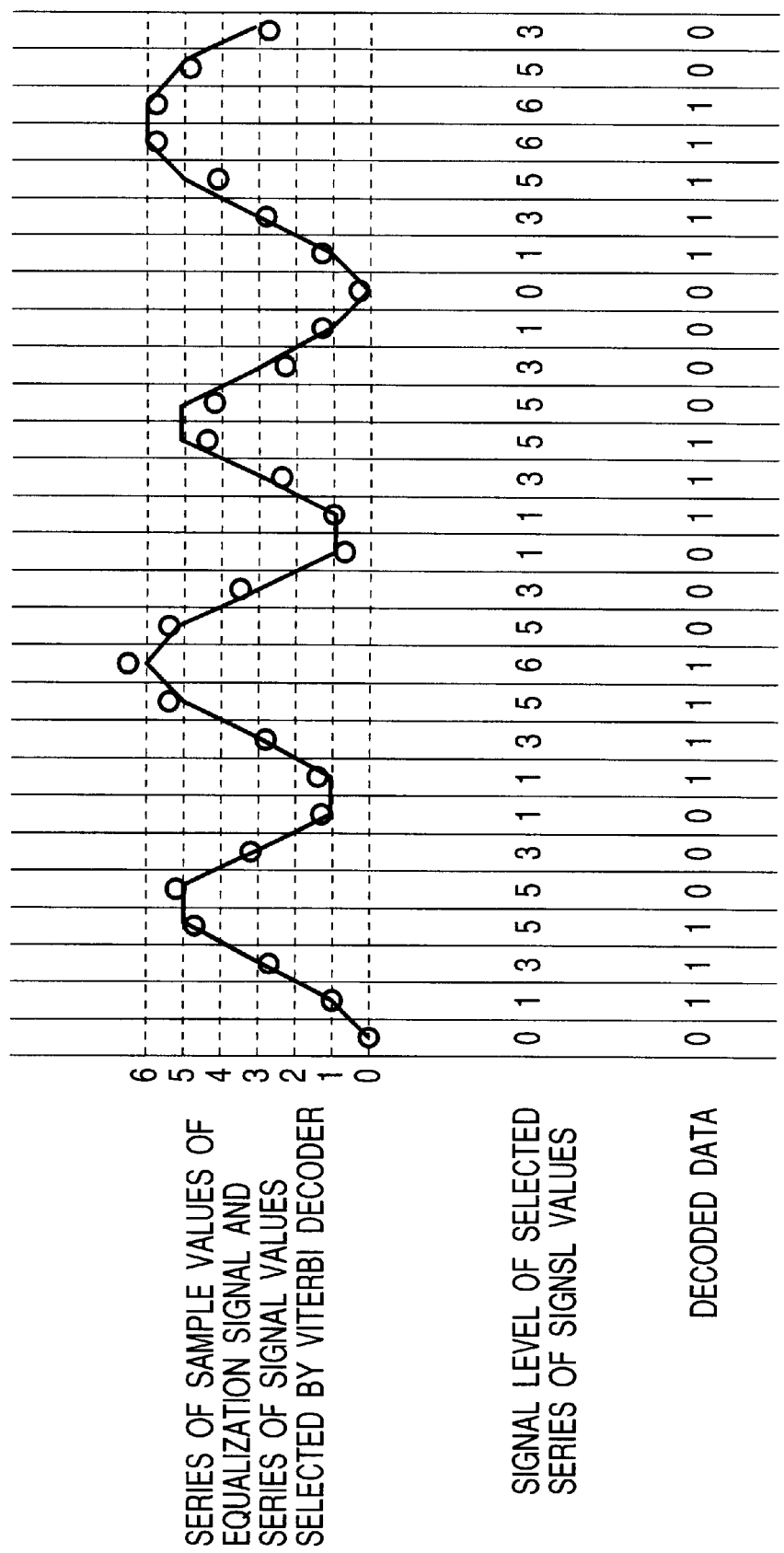
FIG. 13 is a view for explaining the operation of a Viterbi decoder.

Meanwhile, the reproduction signal processing system using the PRML method generally employs a Viterbi decoder, a typical maximum likelihood decoder, as a detector located behind the equalizer. When the equalizer has equalized a reproduction waveform into a waveform of PR (1, 2, 2, 1) characteristic, the Viterbi decoder selects the series of signal values of an equalization signal that minimizes the difference between a series of sample values of the equalization signal and a series of ideal values of the equalization signal, and outputs binary data (decoded data) corresponding to the selected series. FIG. 13 shows this process. In the PRML method, decoding is executed not on the basis of a single sample value but on the basis of a plurality of sample values. Therefore, this method has a high resistance against a signal-degrading component that has no correlation between sample values.

Figure 1:
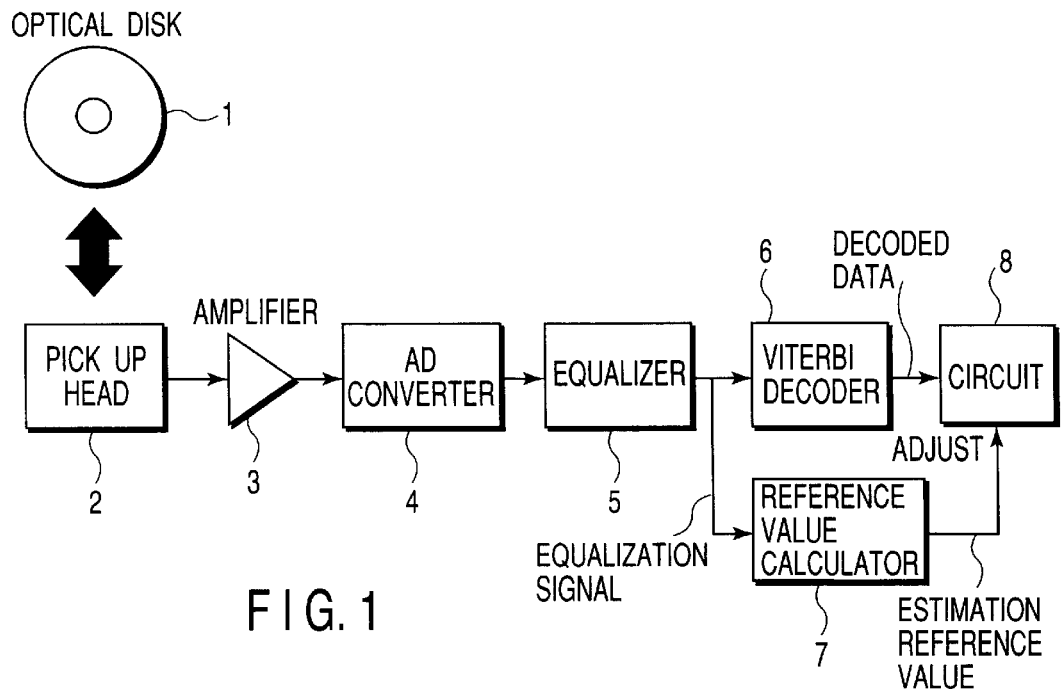
FIG. 1 is a schematic block diagram illustrating an optical disk system according to the invention.
Figure 2:
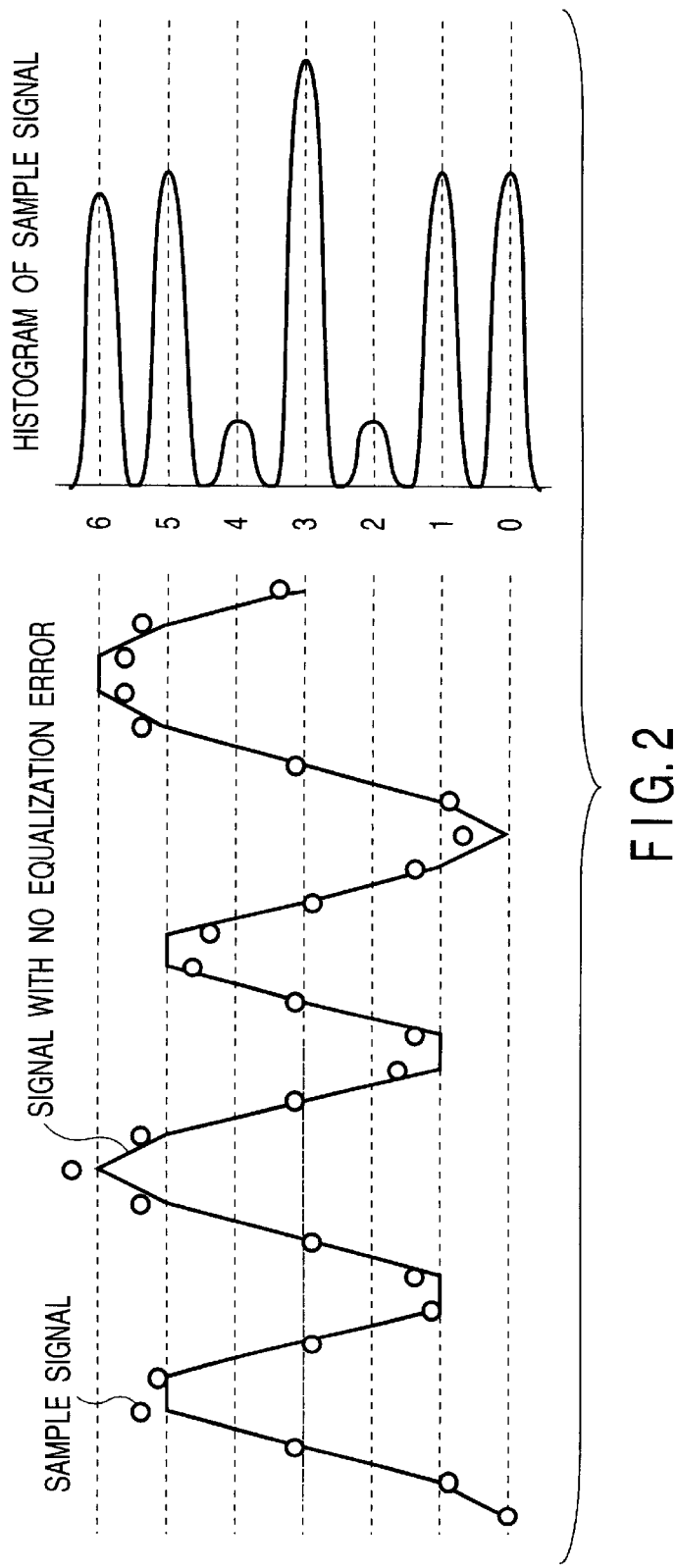
FIG. 2 is a view illustrating the level distributions of an equalization signal of PR (1, 2, 2, 1) characteristic.

FIG. 1 is a block diagram illustrating an optical disk system as one example of an information reproduction apparatus. A reproduction signal obtained by an optical pickup head (PUH) 2 from an optical disk 1 is amplified by an amplifier 3, is then converted by an analog-to-digital (A/D) converter 4, and is converted by an equalizer 5 into an equalization signal that satisfies, for example, a PR (1, 2, 2, 1) characteristic. The equalization signal ranges over seven levels 0, 1, 2, 3, 4, 5 and 6 as shown in FIG. 2.

Referring again to FIG. 1, the equalization signal from equalizer 5 is input to the Viterbi decoder 6 and decoded on the basis of the Viterbi algorithm. The Viterbi decoder supplies the resultant decoded data to a circuit 8 that affects the reading of the information recording medium.

The equalization signal is also input to a reference value calculator 7, where an estimation reference value is calculated. On the basis of the estimation reference value, the optical disk system adjusts its circuit 8 or estimates the quality of information recording medium 1.

Figure 3:
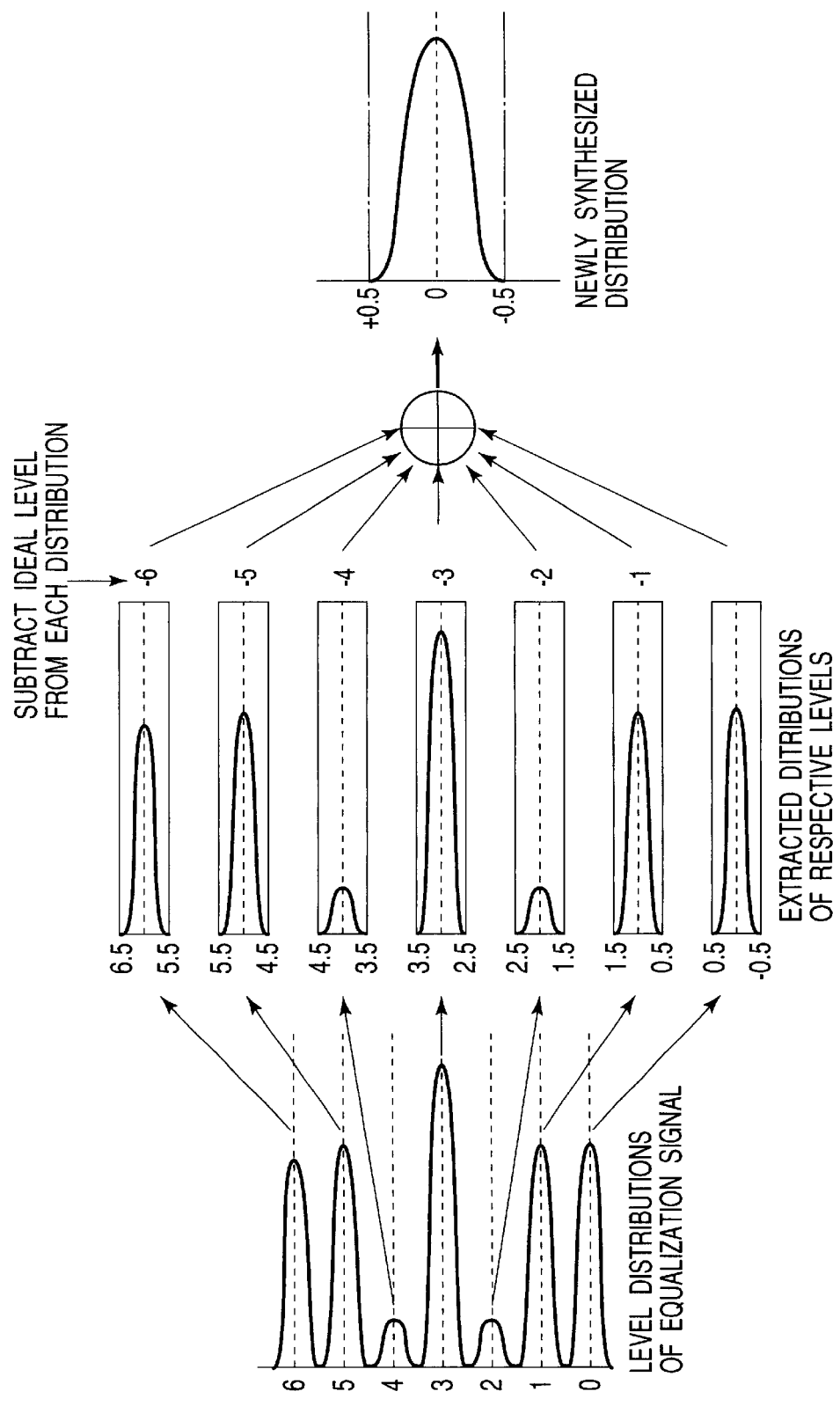
FIG. 3 is a view useful in explaining a method for synthesizing the level distributions of the equalization signal.

Referring to FIG. 3, the operation of the reference value calculator 7 (FIG. 1) will now be described. A distribution including the seven levels 0, 1, 2, 3, 4, 5 and 6 is divided into seven zones [−0.5 0.5], [0.5 1.5], [1.5 2.5], [2.5 3.5], [3.5 4.5], [4.5 5.5] and [5.5 6.5]. Subsequently, the respective ideal levels (0, 1, 2, 3, 4, 5, 6) are subtracted from the seven zones. Lastly, the resultant values of the seven zones are summed to thereby synthesize a new distribution. The standard deviation of the newly synthesized distribution (i.e., the RMS (root mean square) value) may be used as the estimation reference value.

Figure 14:
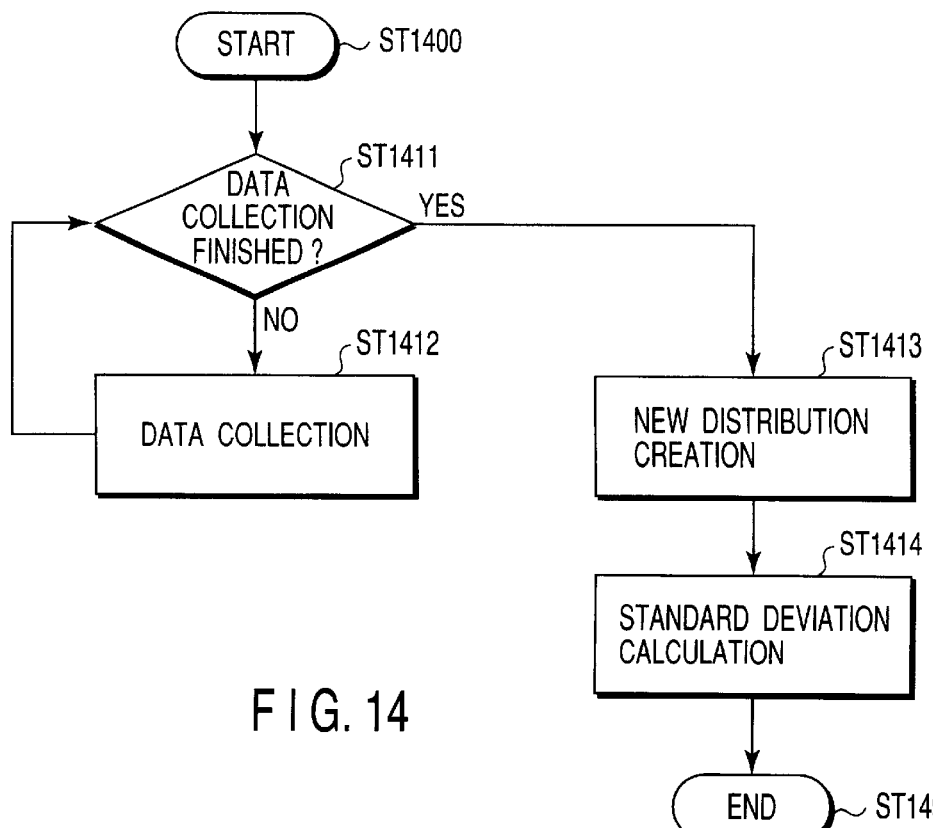
FIG. 14 is a flowchart illustrating a first process for calculating an estimation reference value used to estimate the quality of an information reproduction apparatus or the quality of an information recording medium.

FIG. 14 is a flowchart useful in explaining the case of synthesizing the level distributions of an equalization signal, which range over distributions of (n+1) levels L0, L1, . . . , Ln (L0<L1 . . . <Ln, n>2), thereby creating a new distribution, and using the standard deviation of the new distribution as the estimation reference value. As illustrated in FIG. 14, the process steps 1411–1412 of collecting data are continued until the data collection is detected to be finished (decision block 1411). The data collection step 1412 indicates the collection of the level distributions of the equalization signal. When the data collection process has finished (determined by decision block 1411), the respective ideal levels are subtracted from the collected data (i.e. the distribution of the equalization signal), thereby creating a new distribution (step 1413). The standard deviation of the new distribution is calculated (step 1414) and may be employed as the estimation reference value.

Figure 15:
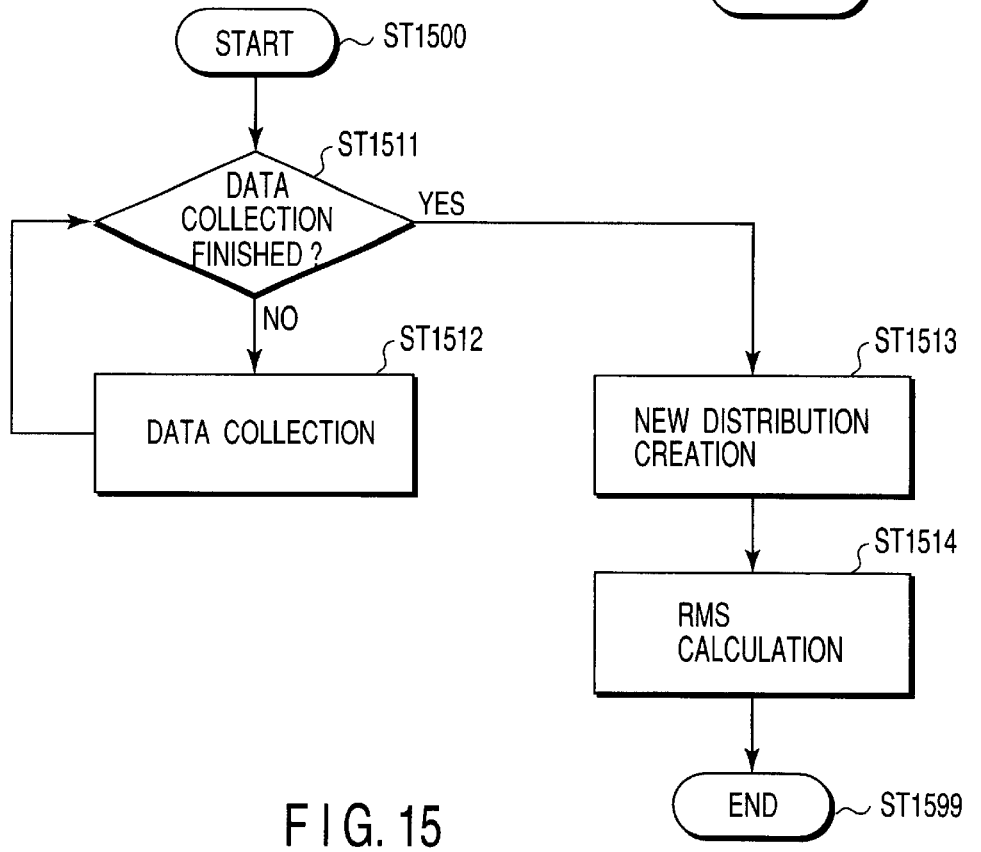
FIG. 15 is a flowchart illustrating a second process for calculating an estimation reference value used to estimate the quality of an information reproduction apparatus or the quality of an information recording medium.

FIG. 15 is a flowchart useful in explaining the case of synthesizing the level distributions of an equalization signal, which range over distributions of (n+1) levels L0, L1, . . . , Ln (L0<L1 . . . <Ln, n>2), thereby creating a new distribution, and using the RMS (root mean square) of the new distribution as the estimation reference value. As illustrated in FIG. 15, the process steps 1511–1512 of collecting data are continued until the data collection is detected to be finished (decision block 1511). The data collection step 1512 indicates the collection of the distribution of the equalization signal. When the data collection process has finished (determined by decision block 1511), the respective ideal levels are subtracted from the collected data (i.e. the distribution of the equalization signal), thereby creating a new distribution (step 1513). The RMS of the new distribution is calculated (step 1514) and may be employed as the estimation reference value.

Figure 5:
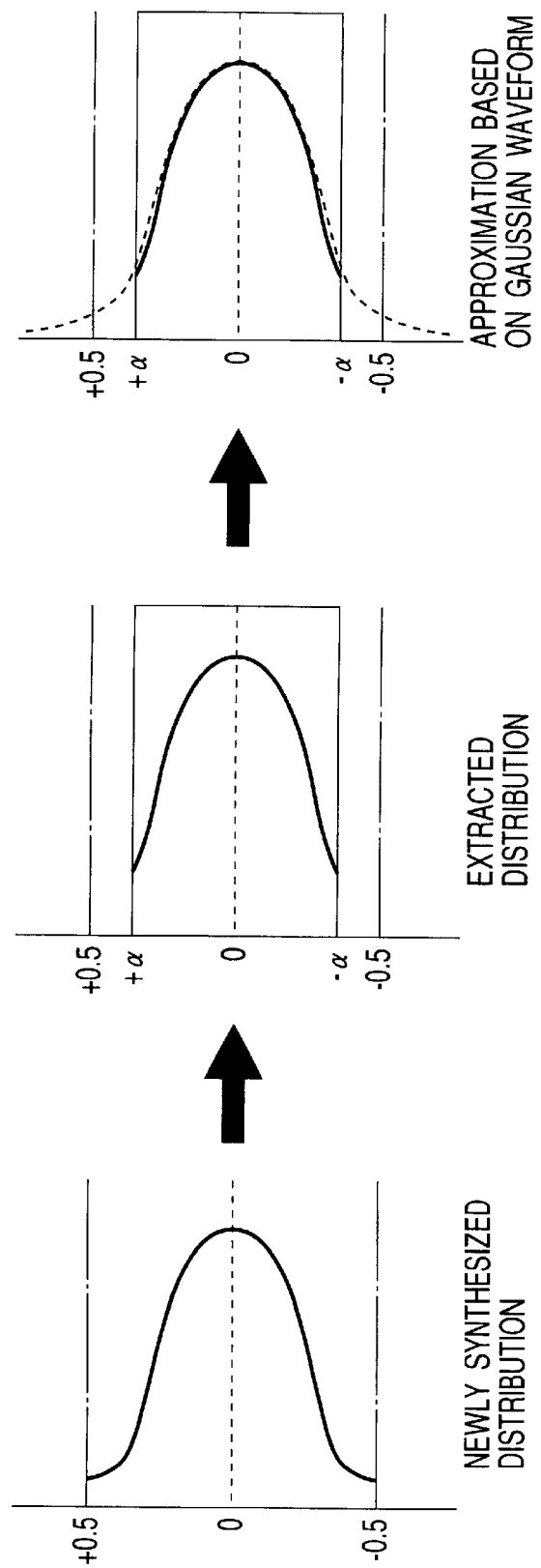
FIG. 5 is a view showing a distribution approximation method that uses a Gaussian waveform.
Figure 16:
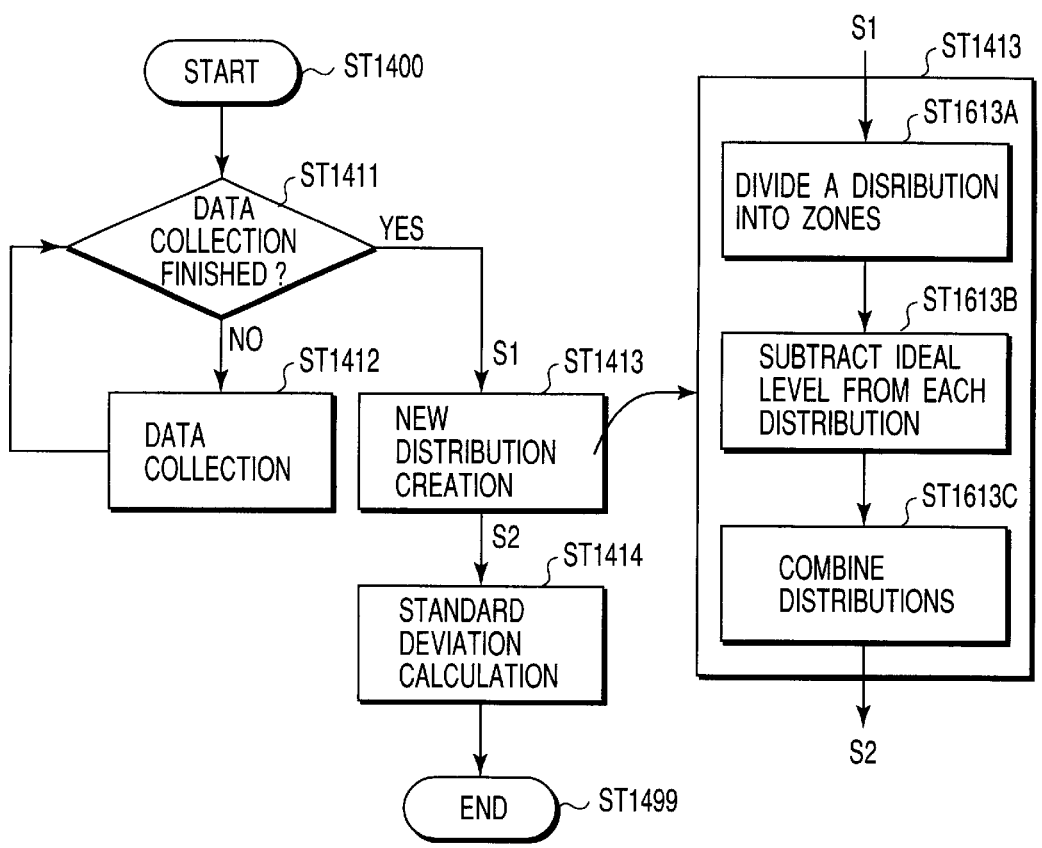
FIG. 16 is a flowchart illustrating a third process for calculating an estimation reference value used to estimate the quality of an information reproduction apparatus or the quality of an information recording medium.

FIG. 16 details an implementation of step 1413 (FIG. 14) of creating a new distribution. As shown in FIG. 16, in step 1613A, the level distributions of the equalization signal, which range over distributions of the (n+1) levels, are divided into (n+1) zones [−∞(L0+L1)/2], [(L0+L1)/2 (L1+L2)/2], . . . , [(Ln−1+Ln)/2+∞]. Thereafter, in step 1613B, the respective ideal levels are subtracted from these zones. In step 1613C, the resultant values of the (n+1) zones are combined (e.g., summed) to thereby synthesize a new distribution. The standard deviation of the newly synthesized distribution is calculated in step 1414, and may be used as the estimation reference value.

Where the level of noise is high, the distributions of the seven levels 0, 1, 2, 3, 4, 5 and 6 are not completely separated from each other, but overlap. In this case, in the new distribution synthesized by the process shown in FIG. 3, the opposite ends (i.e. portions of the distribution near ±0.5) do not have a value of 0 but have a certain value higher than 0. Under these circumstances, it is possible that the accuracy of the standard deviation or the RMS value calculated as above will be reduced by the influence of the overlap. Referring now to FIG. 5, a description will be given of a method for obtaining an accurate distribution even under these circumstances.

First, a zone [−α, +α] (0.1<α<0.5) is extracted from the newly synthesized distribution shown in FIG. 3. An appropriate α enables the extraction of the portion from the newly synthesized distribution, which has opposite ends thereof least influenced by the overlap. Subsequently, the standard deviation σ is selected, which minimizes in zone [−α, +α] the difference between the extracted distribution and Gaussian distribution having the average in position 0 and standard deviation σ. The selected standard deviation σ may be used as the estimation reference value.

Figure 4:
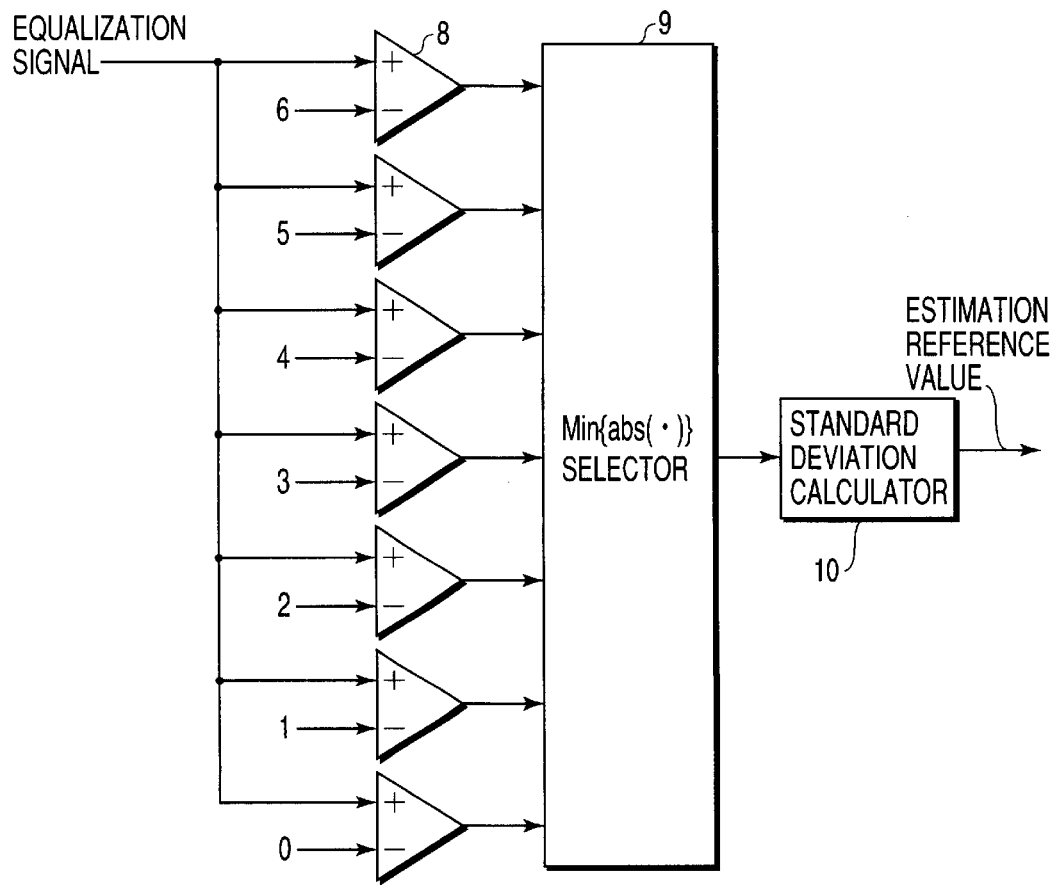
FIG. 4 is a view illustrating the internal structure of a reference value calculator.

FIG. 4 shows a circuit for realizing the process illustrated in FIG. 3. A signal indicating the difference between an equalization signal and each ideal level is input to a Min{abs (•)} selector 9. Min{abs(•)} selector 9 selects the input difference that has a minimum absolute value, and outputs it to standard deviation calculator 10. The standard deviation or the RMS value of the data output from the Min{abs(•)} selector 9 is calculated by standard deviation calculator 10, and may be used as the estimation reference value.

Figure 6:
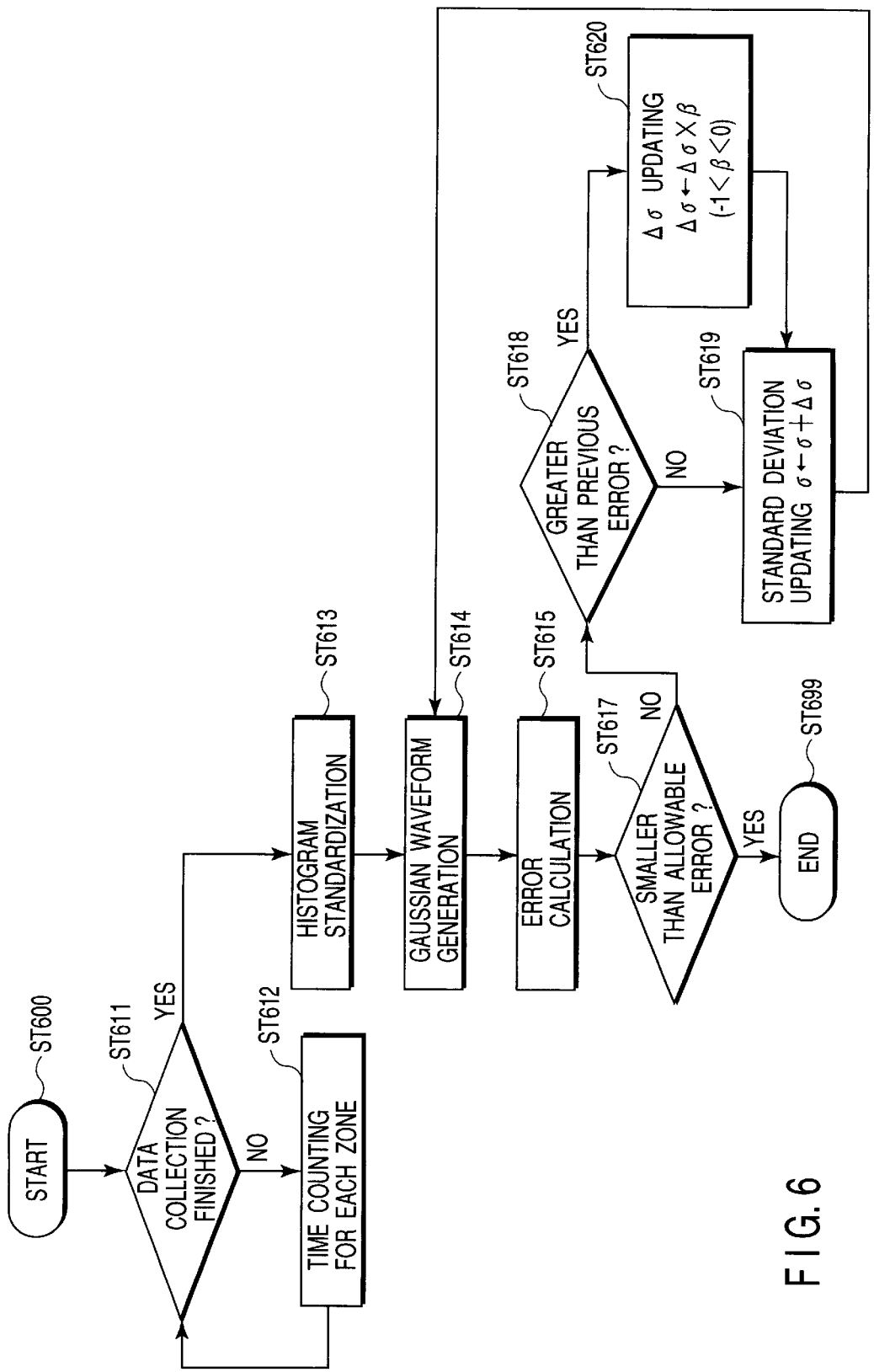
FIG. 6 is a flowchart useful in explaining an approximation that uses a Gaussian waveform.

FIG. 6 is a flowchart useful in explaining the calculation of the standard deviation σ of Gaussian distribution based on the output of the Min{abs(•)} selector 9 of FIG. 4. First, a predetermined number of data items output from the Min{abs(•)} selector 9 are collected. The zone [−α, +α] is divided into [−α, −α+ΔV], [−α+ΔV, −α+2ΔV], . . . , [+α−ΔV, +α] where ΔV indicates the width of each zone. If ΔV is very high, the accuracy of calculation is degraded, while if ΔV is very low, the required data collection time is increased. It is desirable that ΔV should fall within a range of $5 \leq 2\alpha/\Delta V \leq 100$. The representative value X of each zone is X=(−α+ΔV/2, −α+3ΔV/2, . . . , α−ΔV/2). The output data of the Min{abs(•)} selector 9 is distributed to the respective zones. The number of data elements in each zone is divided by the total number of data elements to standardize it (step 613). Each resultant standardized histogram is expressed as H(X).

Approximation using Gaussian distribution (step 614) is executed in the following manner. A Gaussian distribution having an average 0 and standard deviation σ is given by equation (1):

$$G(X)=\exp(-x^2/2\alpha^2) \quad (1)$$

In equation (1), (−α+ΔV/2, −α+3ΔV/2, . . . , α−ΔV/2) is substituted for X, thereby calculating a data series G(X). The initial value of the standard deviation σ is an optional value. Subsequently, standardization is executed using equation (2):

$$Gn(x)=(G(X)/\Sigma G(X)) \quad (2)$$

The square error of the previously-obtained histogram H(X) and Gn(X) is calculated (step 615). If the resultant square error is equal to or less than an allowable value (determined by decision block 617), the standard deviation σ is output, followed by the termination of this process (block 699).

If, on the other hand, the resultant square error is determined by decision block 617 to be higher than the allowable value, it is compared in decision block 618 with a square error obtained in the previous loop of the process. If the present square error is lower than the previous one, the standard deviation σ is altered from σ to (σ+Δσ) in step 619. The initial value of Δσ is an optional value. If the present square error is higher than the previous one, the updating step Δσ is altered to (Δσ×β) (where −1<β<0) as shown in step 620. Thereafter, the standard deviation σ is altered from σ to (σ+Δσ) as shown in step 619. If once the square error is calculated, the updating step Δσ is not altered. Gaussian distribution of a newly selected standard deviation σ is created and then processed on the basis of the same algorithm as the above, and a finally-determined standard deviation σ is output. This is the termination of this process.

Figure 17:
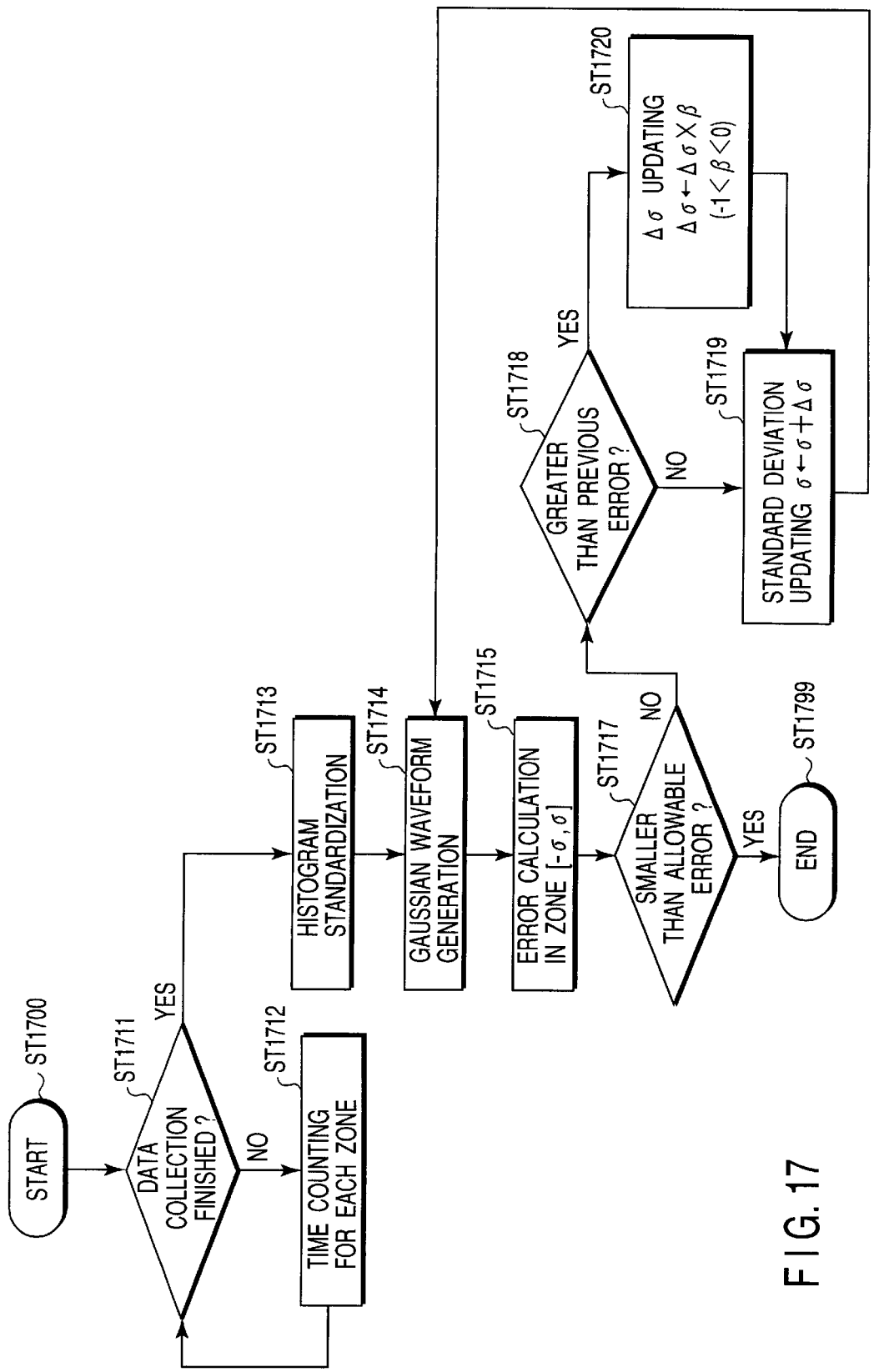
FIG. 17 is a flowchart illustrating a fourth process for calculating an estimation reference value used to estimate the quality of an information reproduction apparatus or the quality of an information recording medium.

FIG. 17 is a flowchart useful in explaining the case where the minimum level difference of the (n+1) ideal levels is ΔL, and approximation is executed at a zone [−α, +α] (where ΔL/10<α<ΔL/2), using Gaussian distribution, thereby employing the standard deviation of Gaussian distribution as the estimation reference value. For brevity, a description of each block in FIG. 17 is omitted, with the understanding that such blocks correspond to respective blocks in FIG. 6 as described above. However, error calculation block 1715 is shown as being carried out in zone [−α, +α].

Figure 7:
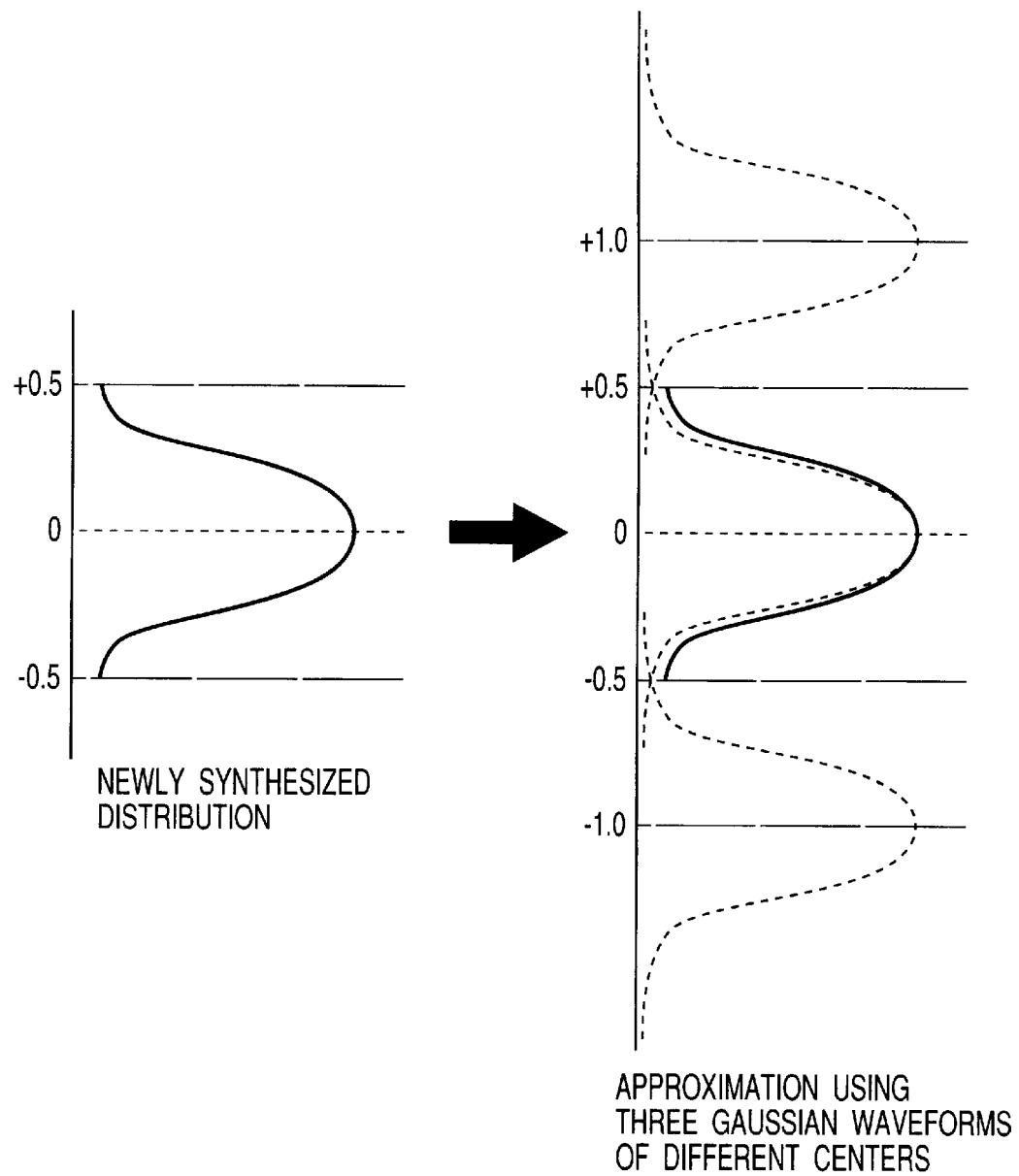
FIG. 7 is a view illustrating a distribution approximation method that uses three Gaussian waveforms having different central points.

Referring to FIG. 7, a description will be given of another method for accurately obtaining a distribution, which is employed when the accuracy of the standard deviation or the RMS value calculated using the circuit shown in FIG. 4 will degrade due to an increase in noise levels. The standard deviation σ is selected that minimizes in the zone [−0.5+ 0.5], the difference between the newly synthesized distribution shown in FIG. 3 and a distribution obtained by summing the Gaussian distributions having their respective averages in positions −1, 0 and +1 and having the standard deviation σ. The selected standard deviation σ is used as the estimation reference value. The selected standard deviation σ is used as the estimation reference value. The standard deviation σ is selected on the basis of the algorithm illustrated in FIG. 6.

Figure 18:
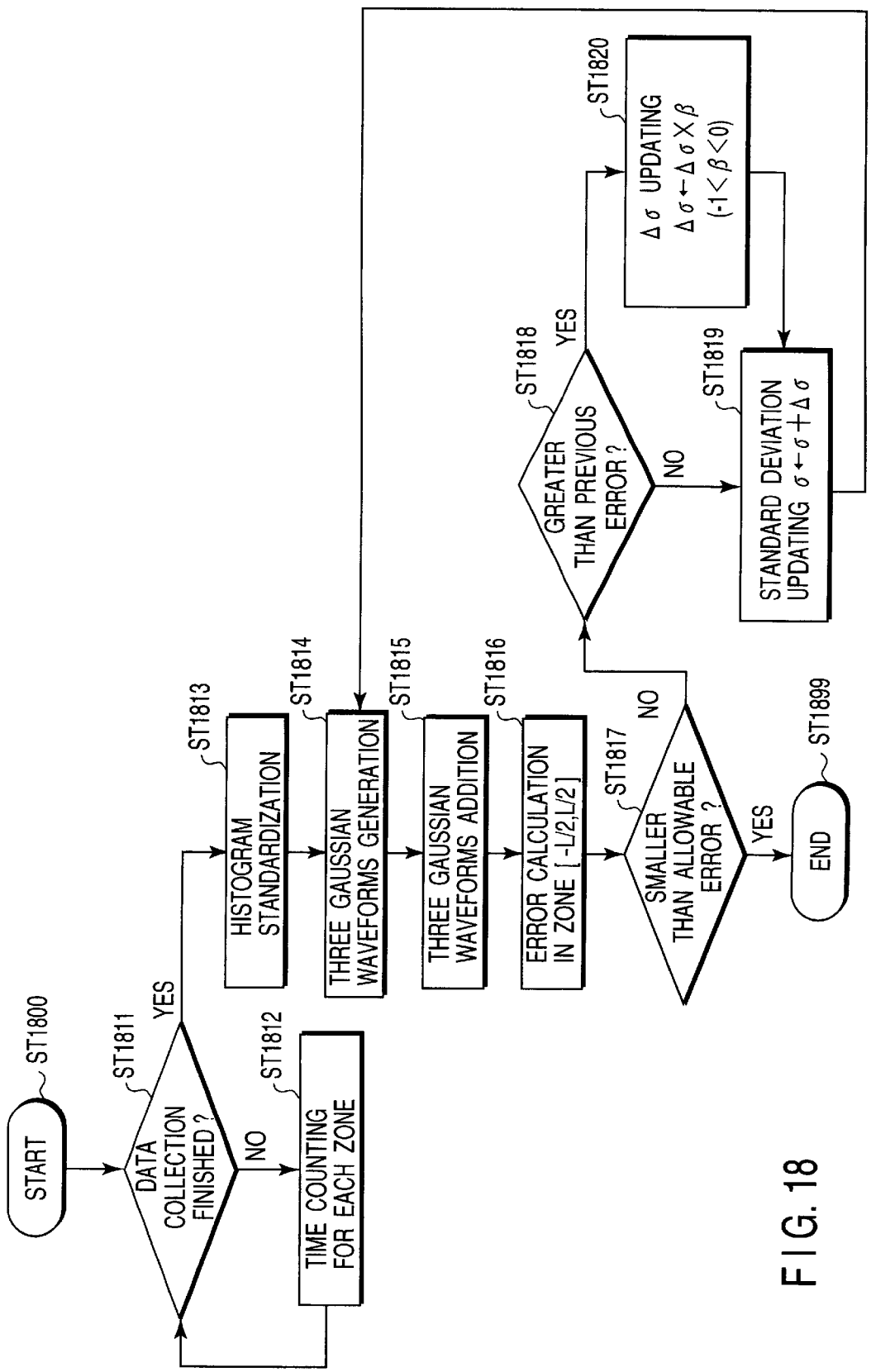
FIG. 18 is a flowchart illustrating a fifth process for calculating an estimation reference value used to estimate the quality of an information reproduction apparatus or the quality of an information recording medium.

FIG. 18 is a flowchart useful in explaining the case in which a newly synthesized distribution is approximated to a distribution obtained by overlapping three Gaussian distributions of the same standard deviation, and the standard deviation of Gaussian distributions is used as the estimation reference value. For brevity, a description of each block in FIG. 18 is omitted, with the understanding that such blocks correspond to respective blocks in FIG. 6 as described above. However, in place of FIG. 6's error calculation block 615, FIG. 18 shows the addition of three Gaussian waveforms (step 1815) followed by error calculation (step 1816) in zone [−L/2 L/2].

Figure 8:
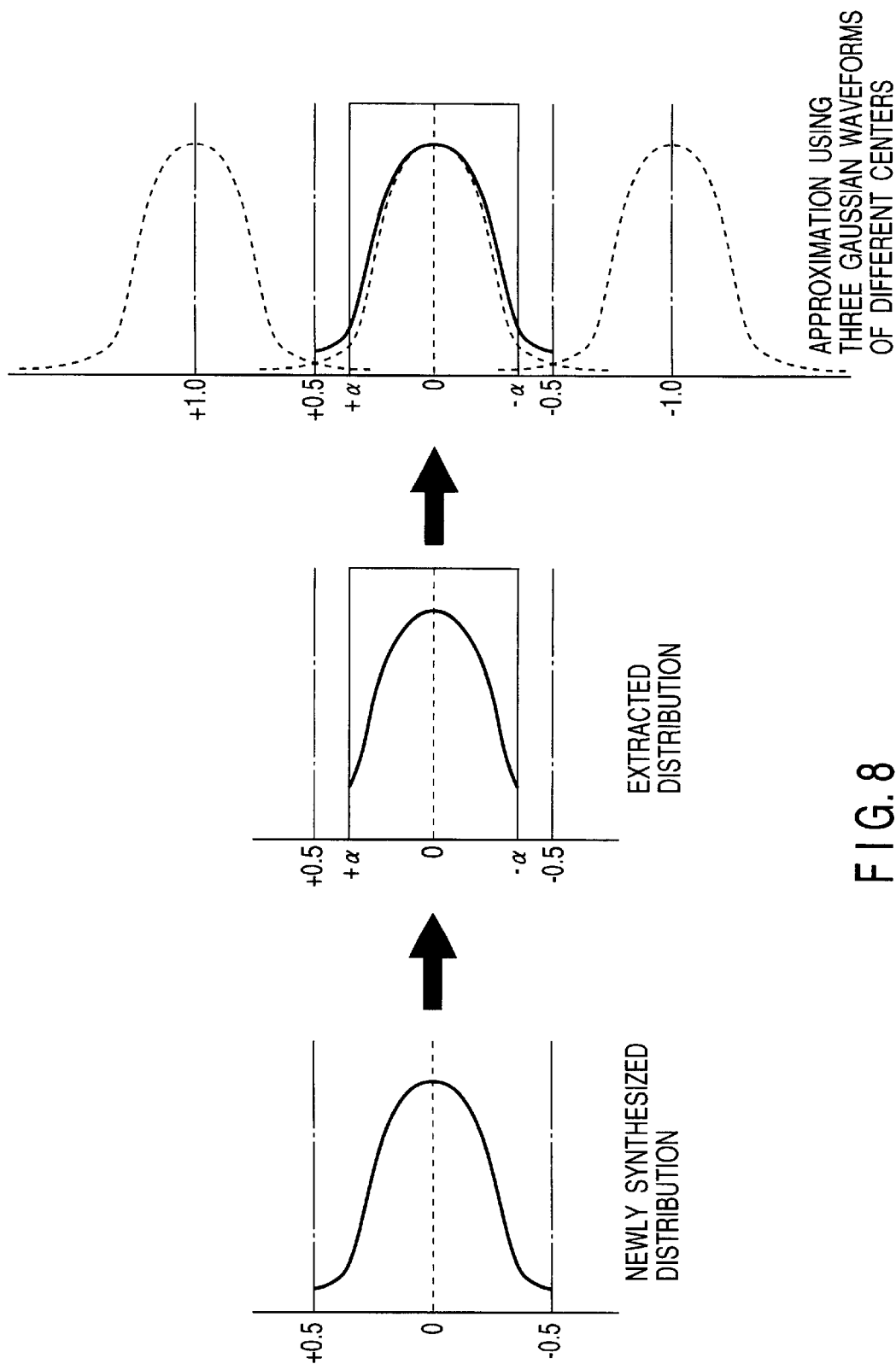
FIG. 8 is a view illustrating an approximation method obtained by combining the distribution approximation methods of FIGS. 5 and 7.

FIG. 8 illustrates a method obtained by combining the methods illustrated in FIGS. 5 and 7. First, a zone [−α +α] (0.1<α<0.5) is extracted from the newly synthesized distribution shown in FIG. 3. Selection of an appropriate α enables the extraction of the portion from the newly synthesized distribution, which is not greatly influenced by overlapping opposite ends thereof. Subsequently, the standard deviation σ is selected that minimizes in the zone [−α, +α], the difference between the extracted distribution and a distribution obtained by summing the Gaussian distributions having their respective averages in positions −1, 0 and +1 and having the standard deviation σ. The selected standard deviation σ may be used as the estimation reference value. The standard deviation σ is selected on the basis of the algorithm illustrated in FIG. 6.

Figure 19:
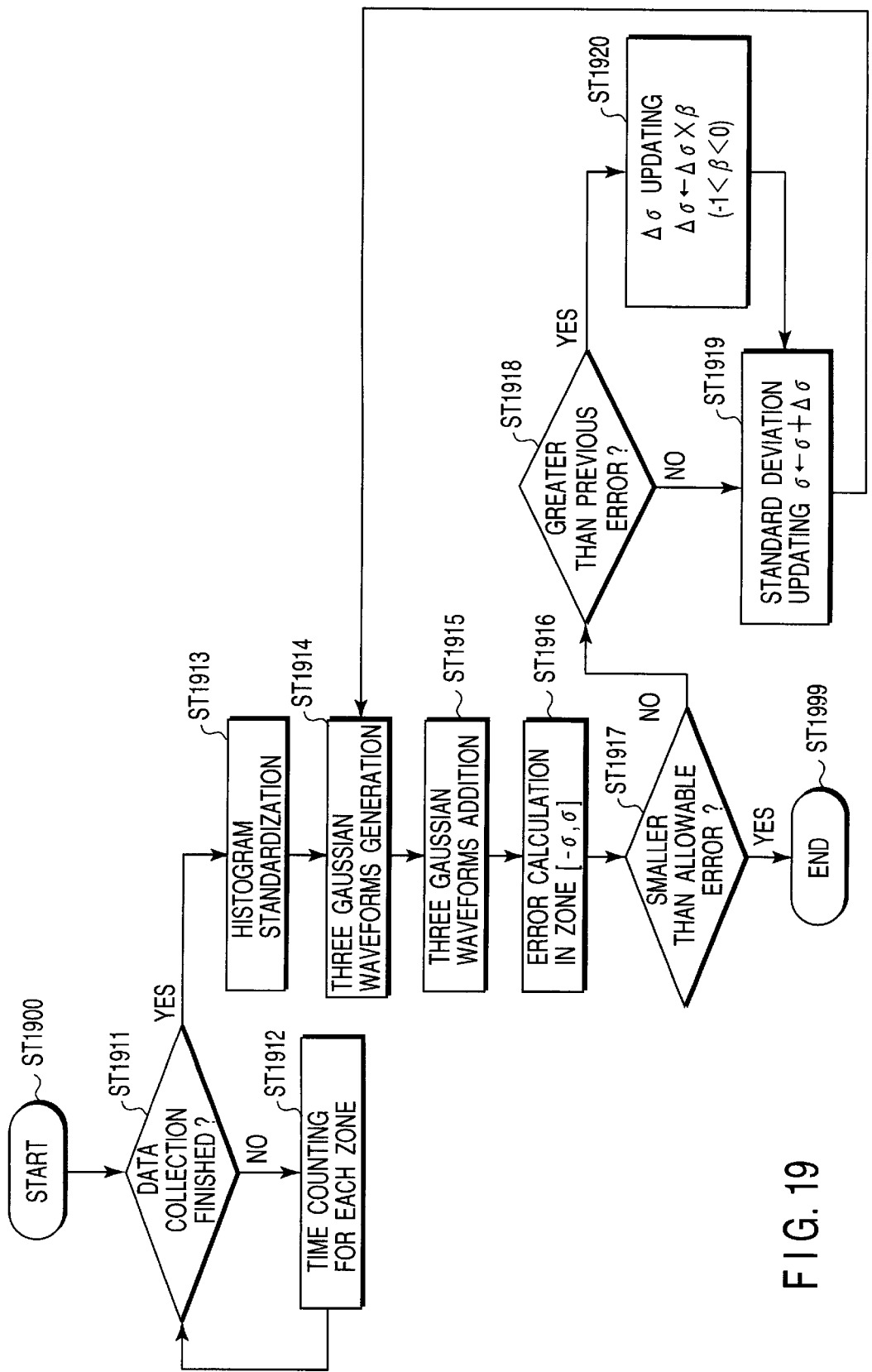
FIG. 19 is a flowchart illustrating a sixth process for calculating an estimation reference value used to estimate the quality of an information reproduction apparatus or the quality of an information recording medium.

FIG. 19 is a flowchart useful in explaining the case in which a newly synthesized distribution is approximated to a distribution obtained by overlapping three Gaussian distributions of the same standard deviation, in a zone [−α +α], where ΔL/10<α<ΔL/2, ΔL is the minimum level difference of the (n+1) ideal levels, and the standard deviation of Gaussian distributions is used as the estimation reference value. For brevity, a description of each block in FIG. 19 is omitted, with the understanding that such blocks correspond to respective blocks in FIG. 6 as described above. However, in place of FIG. 6's error calculation block 615, FIG. 19 shows the addition of three Gaussian waveforms (step 1915) followed by error calculation (step 1916) in zone [−α α].

Although in FIG. 5, the Gaussian distribution used for approximation has the average 0, Gaussian distribution in which the value at a point x0 where H(X) is maximum is used as the average may be used. In this case, the value obtained by formula (3) may be used as the estimation reference value in place of the standard deviation σ:

$$\mathrm{SQRT}(\sigma^2+x0^2) \quad (3)$$

In the methods shown in FIGS. 7 and 8, the three Gaussian distributions have their averages in respective positions −1, 0 and +1. However, the present invention is not limited to this, but may be modified such that the three distributions have their averages in respective positions −1, x0 and +1. Further, alternatively, the three distributions may have their averages in respective positions −1+x0, x0 and +1+x0. In this case, the value obtained by formula (3) may be employed as the estimation reference value in place of the standard deviation α.

Figure 9:
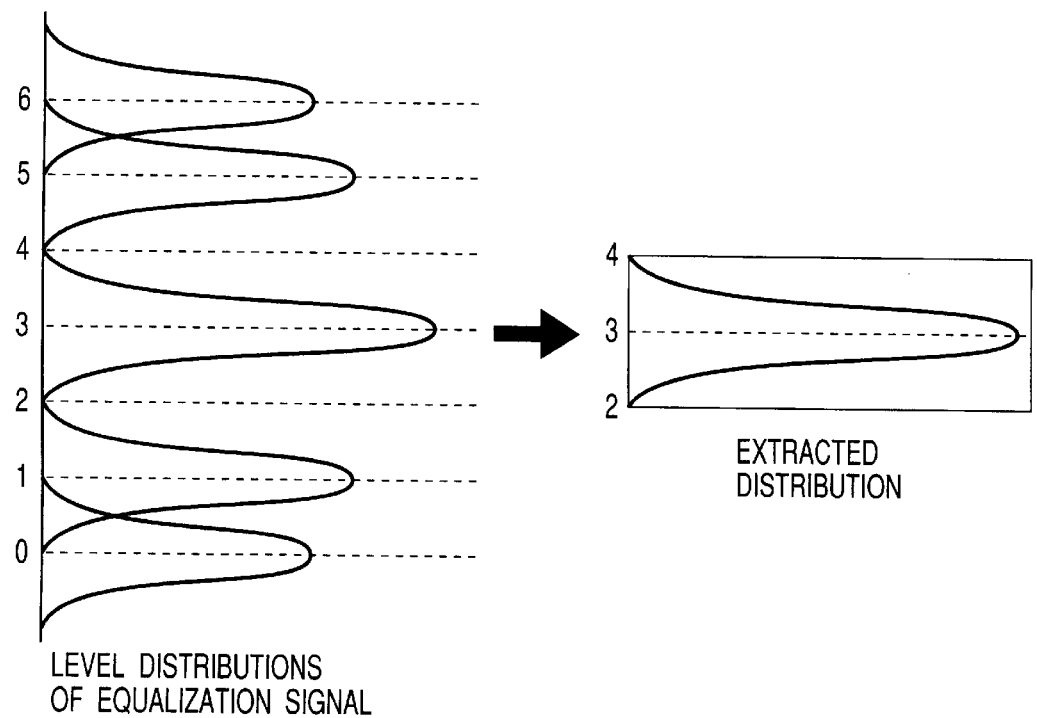
FIG. 9 is a view useful in explaining an estimation reference value calculating method employed when equalization signal levels are biased.

Depending upon the selection of the PR characteristic or the "d limitation" concerning a modulation code, the ideal levels may be biased. For example, when using PR(1, 2, 2, 1) characteristic and a modulation code of d=2, the ideal levels are 0, 1, 3, 5 and 6. At this time, only a distribution of an ideal level 3 is extracted as shown in FIG. 9, and the standard deviation or the RMS value of the extracted distribution is employed as the estimation reference value.

The estimation reference value calculated in the above-described manner is set at σ.

Suppose that σ is standardized on the basis of the minimum level interval of ideal levels. If σ is not more than 33%, sufficiently reliable data reproduction can be realized as a result of the Viterbi decoding process and an error correcting process executed later. Further, if σ is not more than 25%, sufficiently reliable data reproduction can be realized as a result of the Viterbi decoding process and the error correcting process executed later, even when signal degradation occurs due to, for example, tilting of the disk. In light of this, the circuit of the optical disk apparatus (information reproduction apparatus) is adjusted, or the optical disk medium (information recording medium) is created, so that σ will be not more than 33% or 25%.

Further, when Ln and L0 represent the maximum value and the minimum value of the ideal level, respectively, the SNR is calculated by the following equation (4):

$$SNR=20 \log 10\{(Ln-L0)/\sigma\} \quad (4)$$

If the SNR obtained from equation (4) is not less than 25.0, sufficiently reliable data reproduction can be realized as a result of the Viterbi decoding process and the error correcting process executed later. If the SNR obtained from equation (4) is not less than 27.5, sufficiently reliable data reproduction can be realized as a result of the Viterbi decoding process and the error correcting process executed later, even when signal degradation occurs due to, for example, tilting of the disk. In light of this, the circuit of the optical disk apparatus is adjusted, or the optical disk medium is created, so that the SNR obtained from equation (4) will be not less than 25.0 or 27.5.

Moreover, if ΔL represents the minimum level interval of the ideal levels, the SNR is calculated by equation (5):

$$SNR=20 \log 10\{\Delta L/\sigma\} \quad (5)$$

If the SNR obtained from equation (5) is not less than 9.5, sufficiently reliable data reproduction can be realized as a result of the Viterbi decoding process and the error correcting process executed later. If the SNR obtained from equation (5) is not less than 12.0, sufficiently reliable data reproduction can be realized as a result of the Viterbi decoding process and the error correcting process executed later, even when signal degradation occurs due to, for example, tilting of the disk. In light of this, the circuit of the optical disk apparatus is adjusted, or the optical disk medium is created, so that the SNR obtained from equation (5) will be not less than 9.5 or 12.0.

FIG. 20 is a flowchart useful in explaining the case in which the minimum level difference of the (n+1) ideal levels is ΔL, and if a certain level Lm (0<m<n) satisfies Lm−L(m−1)>ΔL and L(m+1)−Lm>ΔL, the standard deviation of a distribution of the level Lm is used as the estimation reference value. As illustrated in FIG. 20, the process of collecting data is continued until the data collection is detected to be finished (steps 2021–2024). The data collection indicates the collection of the level distributions of the equalization signal. When the data collection process has finished, the standard deviation of the distribution of the level Lm is calculated (step 2025) and may be employed as the estimation reference value.

FIG. 21 is a flowchart useful in explaining the case of using the RMS value of the distribution of the level Lm as the estimation reference value. For brevity, a description of each block in FIG. 21 is omitted, with the understanding that such blocks correspond to respective blocks in FIG. 20 as described above. However, FIG. 21's step 2125 (RMS calculation) replaces FIG. 20's step 2025 (standard deviation calculation).

Although the above-described embodiment uses PR (1, 2, 2, 1) characteristic, the invention is not limited to this but is also applicable to the case of using any type of PR characteristic.

Further, the methods shown in FIGS. 5, 7 and 8 for approximating a distribution to Gaussian distribution of a certain standard deviation σ is applicable not only to the case of employing a level detecting method such as the PRML method, but also to a method, such as a waveform slice method, for detecting points in time at which an equalization signal intersects a certain threshold value. In the latter case, a distribution of intersections is approximated to Gaussian distribution of a certain standard deviation σ, and the standard deviation σ is used as the estimation reference value.

Furthermore, although the embodiment employs Gaussian distribution as a distribution to which a certain distribution is approximated, the invention is not limited to this. For example, Lorentz distribution may be used instead of Gaussian distribution, and a parameter indicating the distribution may be used as the estimation reference value.

As described above, in the present invention, the distributions of the levels of an equalization signal are synthesized into a new distribution, which enables easy estimation of the quality of an information recording medium 1 (FIG. 1) or easy adjustment of the circuit 8 of an information reproduction apparatus.

Numerous modifications and variations of the present invention are possible in light of the teachings. It is therefore to be understood that within the scope of the appended claims, the invention may be practiced otherwise than as specifically described.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An estimation method for use in an information reproduction apparatus that produces a reproduction signal while reading from an information recording medium, the method comprising:

converting the reproduction signal into a first equalization signal represented by distributions of a plurality of peak levels;

extracting the plurality of peak levels of the first equalization signal by dividing the first equalization signal into signal components based on predetermined ranges;

subtracting each of ideal levels from the extracted peak levels;

producing a second equalization signal represented by a distribution of a peak level by summing the peak levels from which the ideal levels have been subtracted; and estimating the quality of the information reproduction apparatus or the quality of the information recording medium, using one of a standard deviation and a root mean square of the second equalization signal as an estimation reference value.

2. The estimation method of claim 1, wherein the estimating step includes:

determining the quality of the information reproduction apparatus or the quality of the information recording medium as satisfying a predetermined standard if the estimation reference value is not more than 33%.

3. The estimation method of claim 1, further comprising:

using the estimation reference value to adjust a circuit in the information reproduction apparatus.

4. An information reproduction apparatus comprising:

means for producing a reproduction signal while reading from an information recording medium;

equalization means for converting the reproduction signal into a first equalization signal represented by distributions of a plurality of peak levels; and calculation means for extracting the plurality of peak levels of the first equalization signal by dividing the first equalization signal into signal components based on predetermined ranges, for subtracting each of ideal levels from the extracted peak levels, for producing a second equalization signal represented by a distribution of a peak level by summing the peak levels from which the ideal levels have been subtracted, and for calculating one of a standard deviation and a root mean square of the second equalization signal as an estimation reference value for estimating the quality of the information reproduction apparatus or the quality of the information recording medium.

5. The information reproduction apparatus of claim 4, wherein the means for using the estimation value to estimate the quality of the information reproduction apparatus or the quality of the information recording medium includes:

means for determining the quality of the information reproduction apparatus or the quality of the information recording medium as satisfying a predetermined standard if the estimation reference value is not more than 33%.

6. The information reproduction apparatus of claim 4, further comprising:

a circuit that affects the reading of the information recording medium; and means for using the estimation reference value to adjust the circuit.

* * * * *